United States Patent [19]

Schepers

[11] 4,341,885
[45] Jul. 27, 1982

[54] POLYMER COMPOSITION

[75] Inventor: Herman A. J. Schepers, Stein, Netherlands

[73] Assignee: Stamicarbon, B.V., Geleen, Netherlands

[21] Appl. No.: 249,879

[22] Filed: Apr. 1, 1981

[30] Foreign Application Priority Data

Apr. 4, 1980 [NL] Netherlands .......................... 8002022
Jul. 30, 1980 [NL] Netherlands .......................... 8004377

[51] Int. Cl.$^3$ ............................................. C08L 45/00
[52] U.S. Cl. ........................... 525/211; 260/DIG. 20; 525/192; 525/232; 525/238; 525/240; 524/521
[58] Field of Search ............... 525/192, 210, 211, 238, 525/232, 240; 260/45.85 B, 45.8 NT, 45.8 SN, 32.6 N, 37 N, DIG. 20

[56] References Cited

U.S. PATENT DOCUMENTS 3,819,763  6/1974  Akane et al. ......................... 525/278

Primary Examiner—J. Ziegler

[57] ABSTRACT

An improved polymer composition having a combination of good flow behavior, UV stability, and very good impact resistance is described, essentially composed of a.
  50–95 parts by weight of one or more copolymers obtained by the polymerization of a mixture of
  10–90% by weight of styrene and/or derivatives of styrene, with
  90–10% by weight of acrylonitrile and/or methacrylonitrile; and
b.
  5–50 parts by weight of
  1. a largely saturated rubber, and
  2. chlorinated polyethylene, wherein the chlorinated polyethylene has a chlorine content of at least 10% by weight, a DSC crystallinity of at least 10% and a glass transition temperature of at least equal to $-15°$ C.

11 Claims, 3 Drawing Figures

POLYMER COMPOSITION

This invention relates to an impact resistant polymer composition composed of a copolymer of an unsaturated nitrile, a largely saturated rubber and a chlorinated polyethylene.

Generally, an impact resistant polymer composition based on an unsaturated nitrile contains a graft polymer consisting of a rubber having grafted onto it one or more aliphatically unsaturated monomers, such as styrene, α-methylstyrene, acrylonitrile, vinylchloride, maleic anhydride and/or one or more acrylates. A typical example of such a polymer composition is ABS (graft copolymer of styrene and acrylonitrile on a (butadiene) rubber). As a result of such grafting on the rubber, of a part of the monomers forming the continuous phase (matrix) of the polymer composition, these compositions have a high impact resistance, particularly at low temperatures ($-20°$ C.).

As the rubber, polybutadiene or a rubber related thereto is often used. These rubbers show a high degree of unsaturation in the main chain, and consequently they are sensitive to oxidation under influence of light and/or molecular oxygen. Owing to this, the physical and mechanical properties of objects made from such polymer compositions will strongly deteriorate to the point that they cannot be used, per se, for outdoor applications.

In order to overcome this problem, it has been suggested that the rubber be replaced in the polymer composition by a largely saturated rubber, such as an ethylene-propylene rubber or an ethylene-propylene diene rubber. For this purpose, see, for instance, U.K. patent application No. 2,005,276 laid open to public inspection, or U.S. Pat. No. 3,886,233.

A polymer composition combining a good impact resistance with a good UV stability can thus be obtained.

A disadvantage, however, is that these graft copolymers exhibit a rather poor flow behavior, thus the processing speed is low and, particularly with complicated articles, problems may arise in respect of the filling of the mold. As compared with mixtures of polymers, these graft copolymers also require a rather complicated production process.

In a comparative example in the German Auslegeschrift No. 2,235,052, a polymer composition has been described consisting of 73 parts by weight of styrene-acrylonitrile copolymer, 27 parts by weight of a commercially available chlorinated polyethylene with a chlorine content of 30.3% and 5 parts by weight of ethylene-propylene-ethylidene-norbornene terpolymer. As appears from the text of that application, this polymer composition is lacking in impact resistance and tensile strength.

The purpose of the present invention is to provide an impact resistant polymer composition which does not show the disadvantages mentioned.

The polymer composition according to this invention is essentially characterized by the conditions that the polymer composition comprises:

a.
50–95 parts by weight of one or more copolymers obtained by the polymerization of a mixture of
10–90% by weight of styrene and/or derivatives of styrene, with
90–10% by weight of acrylonitrile and/or methacrylonitrile; and, b.
5–50% parts by weight of
1. a largely saturated rubber, and
2. chlorinated polyethylene, wherein the chlorinated polyethylene has a chlorine content of at least 10% by weight, a DSC crystallinity of at least 10% and a glass transition temperature of at least equal to $-15°$ C.

Surprisingly, it has now been found that such a polymer composition, in which no graft copolymer is incorporated, but which does incorporate a specific chlorinated polyethylene, not only has good flow behavior together with UV stability, but also has a very good impact resistance (even at low temperature). The flow behavior of the polymer composition is, according to applicant's measurements, comparable to the flow behavior of styrene-acrylonitrile copolymers.

In particular, the high impact resistance is surprising, because virtually no impact resistance is shown by polymer compositions based on a copolymer of an unsaturated nitrile and chlorinated polyethylene, or based on such copolymer and a largely saturated rubber, or based on all three components but wherein the chlorinated polyethylene does not meet the above-stated requirements in respect of chlorine content, crystallinity and/or glass transition temperature.

A further advantage of the polymer composition provided by this invention is that the ratio between rubber, CPE and copolymer of an unsaturated nitrile can be varied within wide limits. This means that there is substantial freedom in the making of polymer compositions having a wide range of properties, such as stiffness, heat deflection temperature (Vicat, HDT) impact strength, burning characteristics, gloss, mold shrinkage, flow behavior and deformability, and the like, of the eventual mixtures, without having no interfere in the specific preparation of one of the components, as is the case with the known products based on a graft copolymer.

As rubberlike, largely saturated polymers, those rubbers are suitable which have, in the main chain, either none or very little unsaturation, that is, which have fewer than 2 and preferably fewer than 1.5 double bonds per 100 carbon atoms. In the side chains, on the other hand, the rubbers may have unsaturation, which can be used, for instance, for cross-linking.

As a largely saturated rubber, basically all rubbers showing little or no main chain unsaturation, as described, can be used. Examples of such rubbers are those rubbers based upon ethylene copolymers such as ethylene-propylene rubbers, EPT-rubbers, hydrogenated polybutadiene rubber, acrylate rubber, butylrubber and chloro-butylrubber.

Rubbers which are particularly suitable for use according to the method of this invention are ethylene-propylene copolymers together with which other polyunsaturated monomers have been copolymerized (the so-called EPT rubbers), or mixtures of two or more of these rubbers. Examples of these polyunsaturated monomers include hexadiene-1,4,dicyclopentadiene, tricyclopentadiene, 5-vinylnorbornene-2, 5-ethylidene-norbornene-2, 5-methylene norbornene-2, 5-(2-propenyl)-norbornene-2, 5-(5-hexenyl)norbornene-2, 4,7,8,9-tetrahydro-indene and isopropylidene tetrahydro-indene.

It is not essential for the polymer composition to be vulcanized; consequently, the use of polyunsaturated monomers is not necessary. For economic reasons, it may therefore be advantageous to use ethylene-propylene rubber in the polymer composition.

In certain cases it may also be advantageous to crosslink the rubber, either wholly or partly. This can be effected in the usual manner, for instance, by peroxides or by using chemically modified rubber.

The chlorinated polyethylene, or a mixture of two or more chlorinated polyethylenes, suitable for use in the polymer compositions according to this invention can themselves be made as is already known in the art, e.g., by chlorinating polyethylene in solution, suspension or gas phase. For this purpose see, for instance, the Dutch patent application Nos. 7311780 and 7701599 laid open to public inspection. In this process, high density polyethylene is preferably used as starting material, that is a polyethylene with a density of between 935 and 965 kg/m$^3$, and which may have been made by means of a catalyst based on transition metals. Preference is given to chlorinated polyethylenes with a chlorine content of between 15 and 50% by weight, more specifically between 15 and 30% by weight.

In addition, the chlorinated polyethylene preferably has a crystallinity (measured with Differential Scanning Calorimeter (DSC)) which is greater than 15%, more specifically between 15 and 40% (2nd heating curve).

The crystallinity is determined by first keeping a sample, in a "differential scanning calorimeter", at +150° C. for 5 minutes, subsequently cooling it off to +50° C. at a cooling rate of 5° C. per minute and heating it up again to +150° C. at a rate of 5° C. per minute. During this heating-up the melting heat is measured. The crystallinity is determined by means of the following formula:

$$\text{crystallinity (\%)} = \frac{\text{melting heat measured (J/g)}}{\text{theoretical melting heat of 100\% crystalline polyethylene (J/g)}} \times 100\%$$

The glass transition temperature must be at least equal to −15° C. The upper limit thereof is not critical. In practice, however, the upper limit of the glass transition temperature for chlorinated polyethylene will be established by the requirements imposed in respect of the crystallinity and the chlorine content. This limit is generally at about +10° C.

Glass transition temperature is, in this context, understood to mean the temperature at which the loss modulus G″, measured with a torsion damping meter at a frequency of 0.2153 Hz and a heating-up rate of 1° C. per minute, pertains a maximum, in the vicinity of which the storage modulus, G′ shows a transition from a value characteristic for a glassy state to a value characteristic for a rubbery state.

In this connection it should be noted, however, that chlorinated polyethylene generally has two transition temperatures. One transition is generally in the neighborhood of −120° C. The other transition temperature is at a higher value and varies according to the manner in which the chlorinated polyethylene has been prepared. The latter transition temperature is generally referred to in the literature when the glass transition temperature of chlorinated polyethylene is spoken of. It is, therefore, this latter temperature which is referred to, in the present application, as the glass transition temperature of chlorinated polyethylene.

By the specific choice of the combination of chlorine content, DSC crystallinity and glass transition temperature, a chlorinated polyethylene is obtained which provides in the polymer composition combination, with copolymer and rubber, a surprisingly high impact resistance combined with a good modulus of elasticity and a good flow behavior. It is, therefore, essential that the chlorination conditions be so chosen that relatively much crystalline polyethylene will remain. This can particularly be achieved by chlorinating at relatively low temperatures. Thus, a specific distribution of the chlorine atoms over the polymer molecule is obtained, which manifests itself in a relatively high glass transition temperature.

It is very surprising that, despite the high glass transition temperature, the polymer compositions according to the invention have a good impact resistance, even at low temperature (−20° C.).

As appears from, among other things, the Dutch patent application No. 7311780 mentioned above, chlorinated polyethylene with such a specific distribution of the chlorine atoms is generally hard and brittle, whereas commercially chlorinated polyethylenes are more rubberlike.

The preparation of the copolymer of an unsaturated nitrile can be effected continuously or batchwise, by known polymerization techniques, such as emulsion, suspension, solution and mass polymerization, or combinations thereof, which are all suitable.

As copolymer, the various known copolymers based on acrylonitrile or derivatives thereof can be used.

Examples of applicable copolymers are those of styrene or halo- or alkyl-substituted styrenes with aliphatically unsaturated nitriles, particularly the acrylonitriles, such as styrene-acrylonitrile copolymer, α-methylstyrene-acrylonitrile copolymer, styrene- or α-methylstyrene-acrylonitrile terpolymer as well as copolymers of acrylonitrile with halogenated styrene, or mixtures of two or more of the polymers mentioned.

The weight ratio between the chlorinated polyethylene and the rubber is preferably between 1:20 and 20:1. Within these limits a polymer composition is obtained which has a particularly good impact resistance, even at low temperature (−20° C.).

Optimum properties are achieved if the weight ratio of chlorinated polyethylene to the largely saturated rubber is between 1:4 and 4:1, i.e., from 0.25 to 4.

The polymer composition according to the invention can be made as is known in the art from the various raw materials with application of methods customary for this purpose. Depending on the form in which the raw materials are available (powder, crumb, liquid), various apparatus or combinations thereof can be used, such as an impeller mixer, Banbury mixer, mixing extruder, and the like.

Since impact resistant polymer compositions are generally supplied by the producers in granular form, the polymer composition will generally, after the mixture of the raw materials, be granulated by means of an extruder. In this extruder the mixing may itself be effected as well.

The polymer composition according to the invention preferably consists of a. 50–95% by weight of styrene-acrylonitrile copolymer,
b.1. 2.5–25% by weight of ethylene-propylene rubber or ethylene-propylenediene rubber,
b.2. 2.5–25% by weight of chlorinated polyethylene, and having added thereto c. 0-10% by weight of additives.

The usual additives, such as antioxidants, antistatics, lubricants, fillers, colorants, pigments, UV stabilizers, fungicides, etc., can be added to the polymer composition.

The polymer composition according to the invention is particularly suitable for the manufacture of objects for which high standards are required in respect of the mechanical and physical properties, such as impact resistance, stiffness, etc., particularly if these properties must be combined with UV resistance.

The polymer composition is suitable for many such applications. Thus, such impact resistant objects can be made from it as, for instance, pipes, bottles, furniture, dash boards for motor cars, cabinets, and housings for electronic and domestic equipment, shoe heels, caravans, skis and surf boards.

By means of the accompanying three figures, the invention will now be further elucidated. These figures are photos of three polymer compositions, which photos have been taken with the aid of a "Scanning" electron microscope. The samples from which the photos have been taken were made by breaking a molded sheet in liquid nitrogen. The fracture surface was subsequently provided with a covering film of gold (200 Å). The sample thus prepared was examined with a scanning electron microscope and photographed (enlargement 1800×).

Figure 3:

FIG. 3 is a photomicrograph of a polymer composition according to the invention consisting of 75% by weight of styrene-acrylonitrile copolymer, 12.5% by weight of ethylene-propylene-diene rubber and 12.5% by weight of chlorinated polyethylene with a chlorine content of 27.5% by weight, a crystallinity of 24% and a glass transition temperature of −2° C. (this is Example 9, according to the invention).

Figure 1:
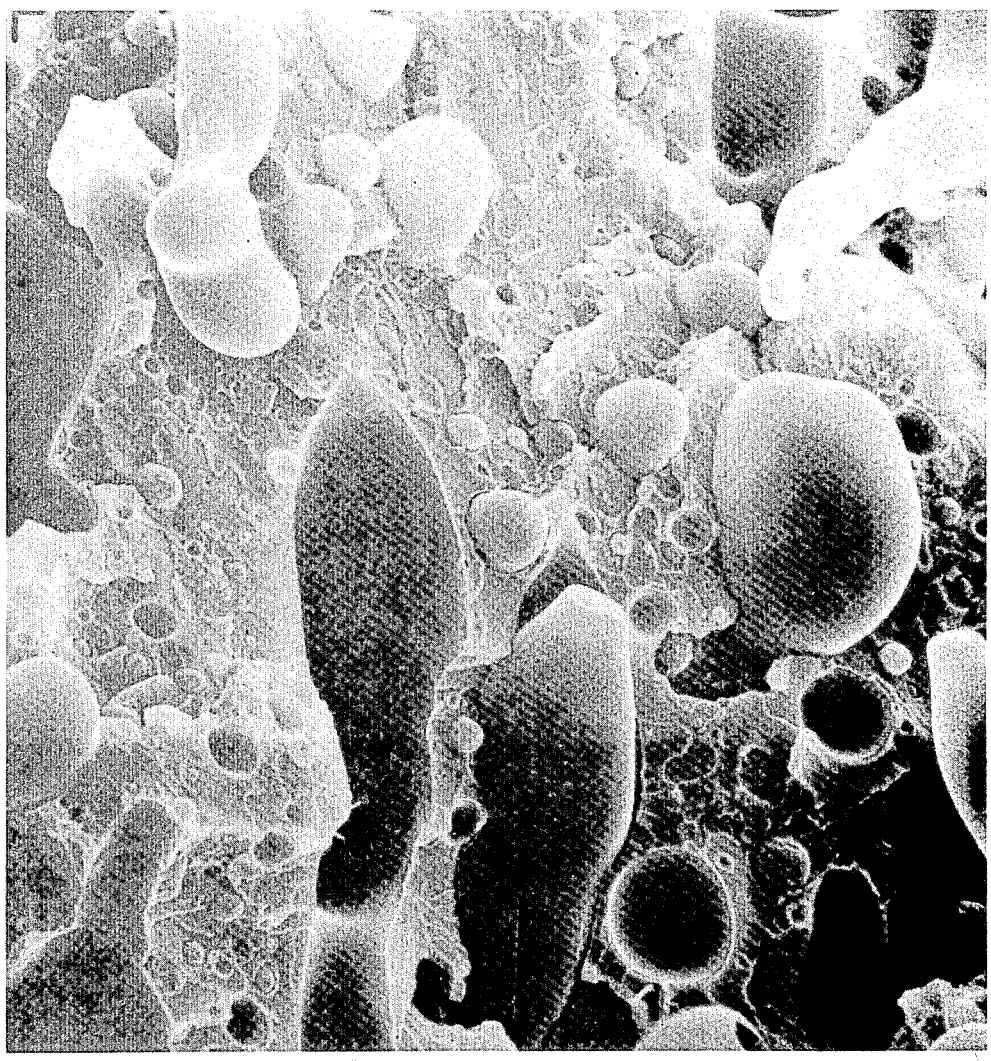
FIG. 1 is a photomicrograph of a polymer composition consisting of 80% by weight of a styrene-acrylonitrile copolymer and 20% of ethylene-propylene-diene rubber (this is Example 2, not according to the invention).
Figure 2:
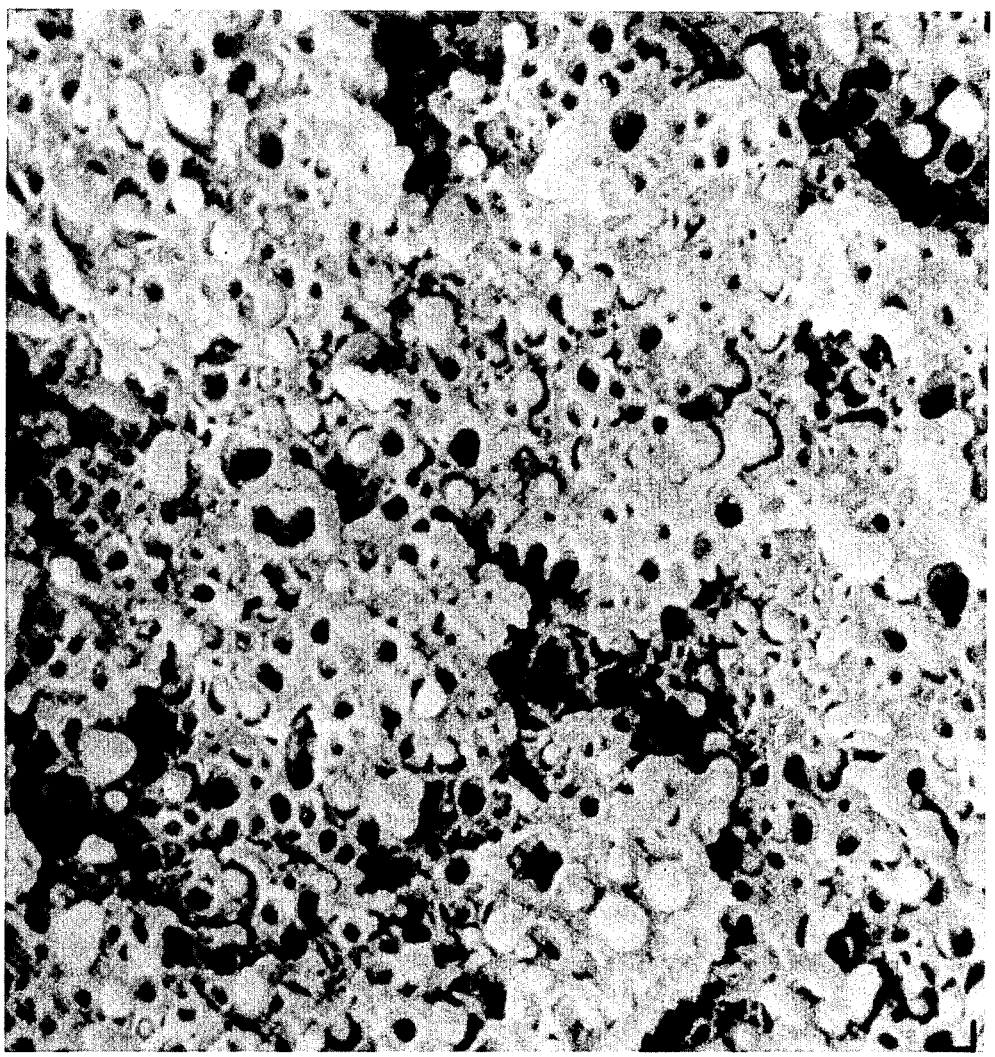
FIG. 2 is a photomicrograph of a polymer composition consisting of 75% by weight of styrene-acrylonitrile copolymer, 12.5% by weight of ethylene-propylene-diene rubber and 12.5% by weight of chlorinated polyethylene with a crystallinity of 0%, a chlorine content of 28.6% by weight and a glass transition temperature of −25° C. (this is Example 11, not according to the invention).

These photos show very clearly that only the use of a very specific chlorinated polyethylene will result in a homogeneous and consequently properly impact resistant polymer composition. Compared with the polymer composition of FIG. 1, addition of chlorinated polyethylene, indeed, gives an improvement of the morphology of the composition (see FIG. 2), which also appears from the impact resistance values. This marginal improvement, however, bears no proportion whatsoever to the improvement occurring on application of the special chlorinated polyethylene, such as according to the present invention (see FIG. 3).

The invention is now further elucidated by means of a number of Examples but is not restricted to the specific embodiments thereof.

EXAMPLES I THROUGH X

In these Examples, it is shown that only the combination of ethylene-propylene-diene rubber (EPT) with chlorinated polyethylene can substantially increase the viscosity of an acrylonitrile copolymer composition.

As nitrile copolymer, a copolymer of acrylonitrile and styrene has been used. Its nitrogen content was 6.9% and the viscosity number was 0.64 dl/g (0.1 g in 100 ml acetone at +20° C.). The EPT rubber employed had an ethylene content of 74% by weight, an ethylidene-norbornene content of 1.85% by weight and a Hoekstra plasticity of 53. The chlorinated polyethylene used had chlorine content of 27.5% by weight, a DSC crystalline content of 24%, a glass transition temperature of −2° C. and had been made by gas phase chlorination of high density polyethylene.

The compositions were made by mixing with a laboratory roller mill at +180° C. for 8 minutes, in which process also 0.25% by weight of stabilizer (Irganox 1076) was added. The mechanical measurements were made on molded sheets. The Izod (notched) was measured according to ASTM D 256 and the bending test was made according to ASTM D 790.

In Table 1 the results of these Examples are included. This Table successively mentions: The number of the Example, the quantities of styrene-acrylonitrile copolymer (SAN), EPT and chlorinated polyethylene, (parts by weight in the polymer composition), the impact resistance (Izod, +23° C., kJ/m$^2$), bending modulus (N/mm$^2$) and the bending strength (N/mm$^2$).

TABLE 1

| | Composition Parts By Wt. | | | Izod 23° C. (kJ/m$^2$) | Bending Modulus (N/mm$^2$) | Max. Bending Strength (N/mm$^2$) |
|---|---|---|---|---|---|---|
| | SAN | EPT | CPE | | | |
| I | 100 | — | — | 1.5 | 3660 | 110 |
| II | 80 | 20 | — | 1.9 | 1630 | 32.7 |
| III | 75 | 25 | — | 2.3 | 1290 | 26.2 |
| IV | 70 | 30 | — | 2.3 | 1320 | 25.4 |
| V | 80 | — | 20 | 1.6 | 2710 | 97.1 |
| VI | 75 | — | 25 | 2.1 | 2490 | 87.2 |
| VII | 70 | — | 30 | 2.4 | 2160 | 75.4 |
| VIII | 80 | 10 | 10 | 12.3 | 2470 | 82.3 |
| IX | 75 | 12.5 | 12.5 | 29.2 | 2190 | 72.2 |
| X | 70 | 15 | 15 | 39.3 | 1780 | 59.6 |

These Examples clearly show tht the presence of both the chlorinated polyethylene and the EPT is essential to reach a good impact resistance at a sufficiently high bending modulus and bending strength.

EXAMPLES XI THROUGH XVII

These Examples concern compositions according to Example IX, except that different chlorinated polyethylenes have been employed which have a comparable chlorine content but different DSC crystalline content and glass transition temperatures. For the compositions XIII and XVI the impact resistance at low temperatures was also measured.

In Table 2 the results of these Examples are mentioned. Included are, successively: number of the Example; chlorine content of CPE (% by weight); crystallinity (%); glass transition temperature (°C.); impact resistance at +23° C. (kJ/m$^2$); bending modulus (N/mm$^2$); bending strength (N/mm$^2$); impact resistance at 0° C., at −10° C., at −20° C. (kJ/m$^2$); HDT (unannealed (°C.).

For these Examples it clearly follows that, with a comparable content, the crystallinity and the glass transition temperature are of essential importance for the polymer compsoition. The polymer compositions according to the invention may, at −20° C., even have an impact resistance comparable with that of the compositions XI, XII and XVII at +23° C., which are outside the limits of the invention.

EXAMPLES XVIII THROUGH XXVII

These Examples generally relate to compositions formulated according to Example IX above, except that chlorinated polyethylenes with increasing chlorine contents have been used.

The results included in Table 3, successively state the number of the Example, the chlorine content (% by weight), crystallinity (%), glass transition temperature (°C.), impact resistance (Izod +23° C., kJ/m$^2$) and bending modulus (N/mm$^2$).

TABLE 2

| | CPE | | | Izod | bending | max. bending | Izod | Izod | Izod | |
|---|---|---|---|---|---|---|---|---|---|---|
| | Cl content (% by wt) | cryst. (%) | $T_g$ (°C.) | +23° C. (kJ/m$^2$) | modulus (N/mm$^2$) | strength (N/mm$^2$) | 0° C. (kJ/m$^2$) | −10° C. (kJ/m$^2$) | −20° C. (kJ/m$^2$) | HDT (°C.) |
| XI | 28.6 | 0 | −25 | 6.2 | 2330 | 73.0 | — | — | — | — |
| XII | 24.4 | 12 | −22 | 6.4 | 2160 | 69.5 | — | — | — | — |
| XIII | 27.5 | 24 | −2 | 29.2 | 2190 | 72.7 | — | — | 7.3 | 86 |
| XIV | 26.05 | 28 | −1.5 | 37.6 | 2090 | 65.8 | — | — | — | — |
| XV | 23.0 | 31 | +1 | 40.0 | 2080 | 67.3 | — | — | — | — |
| XVI | 24.7 | 30 | −1 | 39.1 | 2190 | 68.2 | 18.1 | 13.8 | 7.7 | — |
| XVII | 30 | 3 | −15.5 | 8.9 | 2350 | 77.9 | — | — | — | — |

TABLE 3

| | CPE | | | | |
|---|---|---|---|---|---|
| | CL content (% by wt.) | Crystallinity (%) | $T_g$* (°C.) | Izod (kJ/m$^2$) | Bending Modulus (N/mm$^2$) |
| XVIII | 6.8 | 45 | x | 2.7 | 2010 |
| XIX | 17.1 | 38 | −5 | 25.0 | 2070 |
| XX | 20.2 | 33.4 | x | 32.7 | 2120 |
| XXI | 22.1 | 32.4 | x | 32.1 | 2120 |
| XXII | 25.6 | 26.5 | x | 31.6 | 2214 |
| XXIII | 30.1 | 22 | x | 28.8 | 2225 |
| XXIV | 30.1 | 25 | x | 33.7 | 2280 |
| XXV | 37.3 | 15 | 0 | 23.6 | 2280 |
| XXVI | 41.2 | 14 | −2 | 16.9 | 2300 |
| XXVII | 43 | 0 | −15 | 8.5 | 2340 | x Not determined
*Glass Transition Temperature

These Examples clearly show that a minimum chlorine content (above 10% according to this invention) in the chlorinated polyethylene is essential.

EXAMPLES XXVIII THROUGH XXXII

These Examples relate to compositions formulated according to Examples VIII, IX and X above, except that varying amounts and ratios of the EPT rubber to chlorinated polyethylene were used.

The results are given in Table 4, which successively includes: number of Example, the quantities of SAN, EPT and CPE (parts by weight), impact resistance (Izod +23° C., kJ/m$^2$) and bending modulus (N/mm$^2$). For the purpose of comparison, the Examples V, VIII, II, VI, IX, III, VII, X and IV have also been included in the Table.

TABLE 4

| | SAN (Parts by wt.) | CPE (Parts by wt.) | EPT (Parts by wt.) | Izod (kJ/m$^2$) | Bending Modulus (N/mm$^2$) |
|---|---|---|---|---|---|
| V | 80 | 20 | — | 1.6 | 2710 |
| VIII | 80 | 10.0 | 10.0 | 12.3 | 2470 |
| XXVIII | 80 | 7.5 | 12.5 | 11.1 | 2510 |
| II | 80 | — | 20 | 1.9 | 1630 |
| VI | 75 | 25 | — | 2.1 | 2491 |
| XXIX | 75 | 17.5 | 7.5 | 14.5 | 2264 |
| IX | 75 | 12.5 | 12.5 | 29.2 | 2190 |
| XXX | 75 | 7.5 | 17.5 | 16.9 | 2071 |
| III | 75 | — | 25 | 2.3 | 1290 |
| VII | 70 | 30 | — | 2.4 | 2160 |
| XXXI | 70 | 22.5 | 7.5 | 29.0 | 2040 |
| X | 70 | 15 | 15 | 39.3 | 1780 |
| XXXII | 70 | 7.5 | 22.5 | 18.9 | 1631 |
| IV | 70 | — | 30 | 2.3 | 1320 |

EXAMPLES XXXIII THROUGH XL

These Examples relate to compositions formulated according to Examples XII, XV and XXI (using different chlorinated polyethylenes). The EPT rubber to chlorinated polyethylene ratio is again varied.

Table 5 includes the results of these Examples. For the purpose of comparison, Examples XII, XV and XXI have been included as well. The columns successively state the number of the Example, the number of the Example describing the type of CPE, quantities of SAN, CPE and EPT (parts by weight), impact resistance (Izod, +23° C., kJ/m$^2$) and bending modulus (N/mm$^2$).

TABLE 5

| | CPE From Example | SAN/ Parts By Wt. | CPE Parts By Wt. | EPT Parts By Wt. | Izod (kJ/m$^2$) | Bending Modulus (N/m$^2$) |
|---|---|---|---|---|---|---|
| XXXIII | 12 | 75 | 20 | 5 | 4.1 | 2030 |
| XXXIV | 12 | 75 | 17.5 | 7.5 | 4.9 | 2040 |
| XII | 12 | 75 | 12.5 | 12.5 | 6.4 | 2160 |
| XXXV | 12 | 75 | 7.5 | 17.5 | 7.3 | 2150 |
| XXXVI | 12 | 75 | 5 | 20 | 6.0 | 2270 |
| XXXVII | 15 | 75 | 15 | 10 | 33.7 | 2220 |
| XV | 15 | 75 | 12.5 | 12.5 | 40.0 | 2080 |
| XXXVIII | 15 | 75 | 10 | 15 | 37.1 | 2090 |
| XXXIX | 21 | 75 | 17.5 | 7.5 | 16.7 | 2290 |
| XXI | 21 | 75 | 12.5 | 12.5 | 32.1 | 2120 |
| XL | 21 | 75 | 7.5 | 17.5 | 16.9 | 1980 |

EXAMPLES XLI AND XLII

These Examples relate to compositions formulated according to Example XIII. However, different EPT rubbers have been used.

Table 6 successively mentions: the number of the Example, the quantities of SAN, CPE and EPT, the ethylene content of the EPT (% by weight), hexadiene content of the EPT (% by weight), ethylidene-norbornene content of EPT (% by weight), Koekstra plasticity of the EPT, impact resistance 9Izod, +23° C., kJ/m²), bending modulus (N/mm²) and bending strength (N/mm²).

EXAMPLES XLIII AND XLIV

These Examples relate to compositions incorporating copolymers of acrylonitrile and α-methylstyrene (αMSAN) with different viscosity numbers (0.1 g in 100 ml dimethylformamide at +20° C. (dl/g). Different chlorinated polyethylenes have been employed. In Table 7 the results are given.

TABLE 6

|   | SAN (pts by wt) | CPE (pts by wt) | EPT (pts by wt) | ethylene content (% by wt) | hexadiene content (% by wt) | ethylidene norbornene content (% by wt) | Hoekstra plasticity | Izod (kJ/m²) | bending modulus (N/mm²) | max. strength (N/mm²) |
|---|---|---|---|---|---|---|---|---|---|---|
| XIII | 75 | 12.5 | 12.5 | 74 | 1.85 | — | 53 | 29 | 2190 | 73 |
| XLI | 75 | 12.5 | 12.5 | 56 | 1.4 | — | 43 | 28 | 2100 | 65 |
| XLII | 75 | 12.5 | 12.5 | 68 | — | 5 |  | 31 | 2150 | 70 |

TABLE 7

|   | αMSAN N (% by wt) | αMSAN viscosity number | αMSAN (pts by wt) | type CPE (example) | CPE (pts by wt) | EPT (pts by wt) | Izod (kJ/m²) | bending modulus (N/mm²) | max. bending strength (N/mm²) |
|---|---|---|---|---|---|---|---|---|---|
| XLIII | 7.9 | 0.60 | 75 | 22 | 12.5 | 12.5 | 23.8 | 2250 | 71.0 |
| XLIV | 7.7 | 1.00 | 75 | 14 | 12.5 | 12.5 | 23.9 | 1980 | 67.9 |

Successively mentioned are: the number of the Example, the N content of the copolymer, the viscosity number of the copolymer, the quantity of copolymer (parts by weight), the type of CPE, the quantity of CPE (parts by weight), the quantity of EPT (parts by weight), the impact resistance (Izod, +23° C., kJ/m²), the bending modulus (N/mm²) and the bending strength (N/mm²).

EXAMPLES XLV AND XLVI

These Examples relate to compositions formulated according to Example XXI. In Example XLV a part of the EPT rubber has been replaced by polyvinylchloride (K-value 71 according to DIN 53726). In Example XLVI, the same PVC has replaced part of the chlorinated polyethylene.

These Examples can be compared with Examples from the German Auslegeschrift No. 2235052.

Table 8 successively mentions: the number of the Example, the quantities of SAN, CPE, PVC and EPT (parts by weight), impact resistance (Izod, +23° C. kJ/m²), bending modulus (N/mm²) and bending strength (N/mm²).

TABLE 8

|   | SAN (Pts by wt) | CPE (Pts by wt) | PVC (Pts by wt) | EPT (Pts by wt) | Izod (mJ/m²) | Bending Modulus (N/mm²) | Max. Bending Strength (N/mm²) |
|---|---|---|---|---|---|---|---|
| XXI | 75 | 12.5 | — | 12.5 | 32.1 | 2120 | 65.3 |
| XLV | 75 | 12.5 | 5 | 7.5 | 3.7 | 2510 | 85.4 |
| XLVI | 75 | 7.5 | 5 | 12.5 | 12.9 | 2330 | 72.4 |

The Table shows that the polymer composition according to the invention very definitely has better properties than that according to the German Auslegeschrift No. 2235052.

EXAMPLES XLVII AND XLVIII

For two unstabilized impact resistant polymer compositions the UV stability has been determined. This was done in an Atlas Weather-Ometer, type 600 WR, with a lamp of 6500 Watt and porosilicate filters. The intensity was 40 μW/cm² at 340 nm and the irradiation was on one side. The temperature in the space was 34° C. and the relative humidity was 55±5%.

Example XLVII employed a graft copolymer of styrene and acrylonitrile on a butadiene rubber, and Example XLVIII employed the polymer composition according to Example XIII.

The UV stability (expressed as the irradiation time in which the Dynstat impact value has fallen to half the original values) in respect of Example XLVIII was four times as high as for Example XLVII.

What is claimed is:

1. An impact resistant polymer composition combination formulated from the combination of
    a. 50–95 parts by weight of at least one copolymer obtained by the copolymerization of 10 to 90% by weight of a styrene monomer with 90 to 10% by weight of an acrylonitrile monomer, and
    b. 5 to 50 parts by weight of
        b.1. a rubber substantially free from chain unsaturation,
        b.2. a chlorinated polyethylene having a chlorine content of at least 10% by weight, a DSC crystallinity of at least 10% and a glass transition temperature of at least −15° C.

2. The polymer composition according to claim 1, wherein said copolymer is a copolymer of styrene or α-methylstyrene with acrylonitrile.

3. The polymer composition according to either claim 1 or 2, wherein said rubber is an ethylene-propylene rubber or an ethylene-propylenediene rubber.

4. The polymer composition according to any one of claims 1 or 2, wherein said chlorinated polyethylene has a chlorine content of from 15 to 50% by weight.

5. The polymer composition according to any one of claims 1 or 2, wherein said chlorinated polyethylene has a DSC crystallinity of from 15 to 60% and a chlorine content of from 15 to 50% by weight.

6. The polymer composition according to any one of claims 1 or 2, wherein said chlorinated polyethylene has a DSC crystallinility of from 15 to 40% and a chlorine content of from 15 to 50% by weight.

7. The polymer composition according to any one of claims 1 or 2, wherein the weight ratio of said chlorinated polyethylene to said rubber is between 1:20 and 20:1.

8. The polymer composition according to any one of claims 1 or 2, wherein the weight ratio of said chlorinated polyethylene to said rubber is between 1:4 and 4:1.

9. The polymer composition according to claim 1, which consists of a. 50 to 90% by weight of a styreneacrylonitrile copolymer or an α-methylstyrene-acrylonitrile copolymer,
b.1. 2.5 to 25% by weight of an ethylenepropylene rubber of an ethylenepropylene-diene rubber,
b.2 2.5 to 25% by weight of chlorinated polyethylene.

10. The polymer composition according to claim 9, having added thereto an additive in an amount up to about 10%.

11. The polymer composition according to claim 10, wherein said additive is an antioxidant, antistatic, lubricant, filler, colorant, pigment, UV stabilizer or fungicide agent.

* * * * *